United States Patent
Smith et al.

(10) Patent No.: US 6,840,052 B2
(45) Date of Patent: Jan. 11, 2005

(54) AIR CONDITIONING SYSTEM

(76) Inventors: Wade W. Smith, 16 Southern Hills Dr., Skillman, NJ (US) 08558; David A. Saar, 37 Todd Ridge Rd., Titusville, NJ (US) 08560

(*) Notice: Subject to any disclaimer, the term of this patent is extended or adjusted under 35 U.S.C. 154(b) by 0 days.

(21) Appl. No.: 10/417,889

(22) Filed: Apr. 17, 2003

(65) Prior Publication Data
US 2004/0206097 A1 Oct. 21, 2004

(51) Int. Cl.[7] .............................................. F25B 49/02
(52) U.S. Cl. ............................ 62/126; 62/127; 62/131; 62/176.6; 236/94
(58) Field of Search .......................... 62/125, 126, 127, 62/129, 130, 131, 176.1, 176, 176.6; 236/94, 44 R, 44 C, 51; 165/230, 231, 232, 233

(56) References Cited

U.S. PATENT DOCUMENTS

| | | | |
|---|---|---|---|
| 4,290,480 A | * | 9/1981 | Sulkowski .................. 165/228 |
| 4,841,733 A | * | 6/1989 | Dussault et al. ................ 62/93 |
| 5,330,385 A | * | 7/1994 | Hotta et al. .................... 454/75 |
| 5,544,809 A | * | 8/1996 | Keating et al. ............ 236/44 C |
| 5,887,651 A | * | 3/1999 | Meyer ......................... 165/223 |
| 6,161,763 A | * | 12/2000 | Reuter ...................... 236/44 C |
| 6,196,468 B1 | * | 3/2001 | Young ....................... 236/46 R |
| 6,401,466 B1 | * | 6/2002 | Olsen ........................... 62/131 |

* cited by examiner

Primary Examiner—Harry B. Tanner
(74) Attorney, Agent, or Firm—Spencer T. Smith

(57) ABSTRACT

An air conditioning system cools air within an area. An air conditioner controller defines information based on input data from door and window open status sensors and a return air monitor sensing the dry bulb temperature and the wet bulb temperature or relative humidity of the air within the area being cooled by the air conditioning system and shuts down the system when specific conditions exist. The defined information is transmitted to a remote host device which retains and presents the transmitted information or information derived therefrom.

10 Claims, 5 Drawing Sheets

AIR CONDITIONING SYSTEM

The present invention relates to air conditioning systems which are used in commercial buildings, hotels, apartment houses or the like to cool localized areas.

BACKGROUND OF THE INVENTION

Occupants routinely crank up the air conditioning (A/C) for extended periods of time, running down the temperature of the wall, ceiling and floor mass. When they return to the room and open the outside slider they let outside humidity into the room which condenses on these cold surfaces. Visible surfaces warm quickly eliminating any problem that could arise from the condensation but the sheet rock and concrete have thermal inertia prolonged by the insulating effect of the carpet and wall coverings and this encourages moisture that penetrates the wall covering or carpet to condense on the surface and become absorbed by the concrete or sheetrock as condensation. These wet, humid, dark areas then harbor the conditions that are ideal for mold and mildew growth. Odor and degradation of carpet and wall covering are next. In some individuals, the presence of mold spores can also cause respiratory problems, and some mold spores are poisonous to all individuals.

OBJECT OF THE INVENTION

It is accordingly an object of the present invention to provide a control system for an air conditioner which will minimize the conditions that create mold and mildew growth and to monitor room conditions and inform management when conditions persist which will encourage the growth of mold and mildew.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
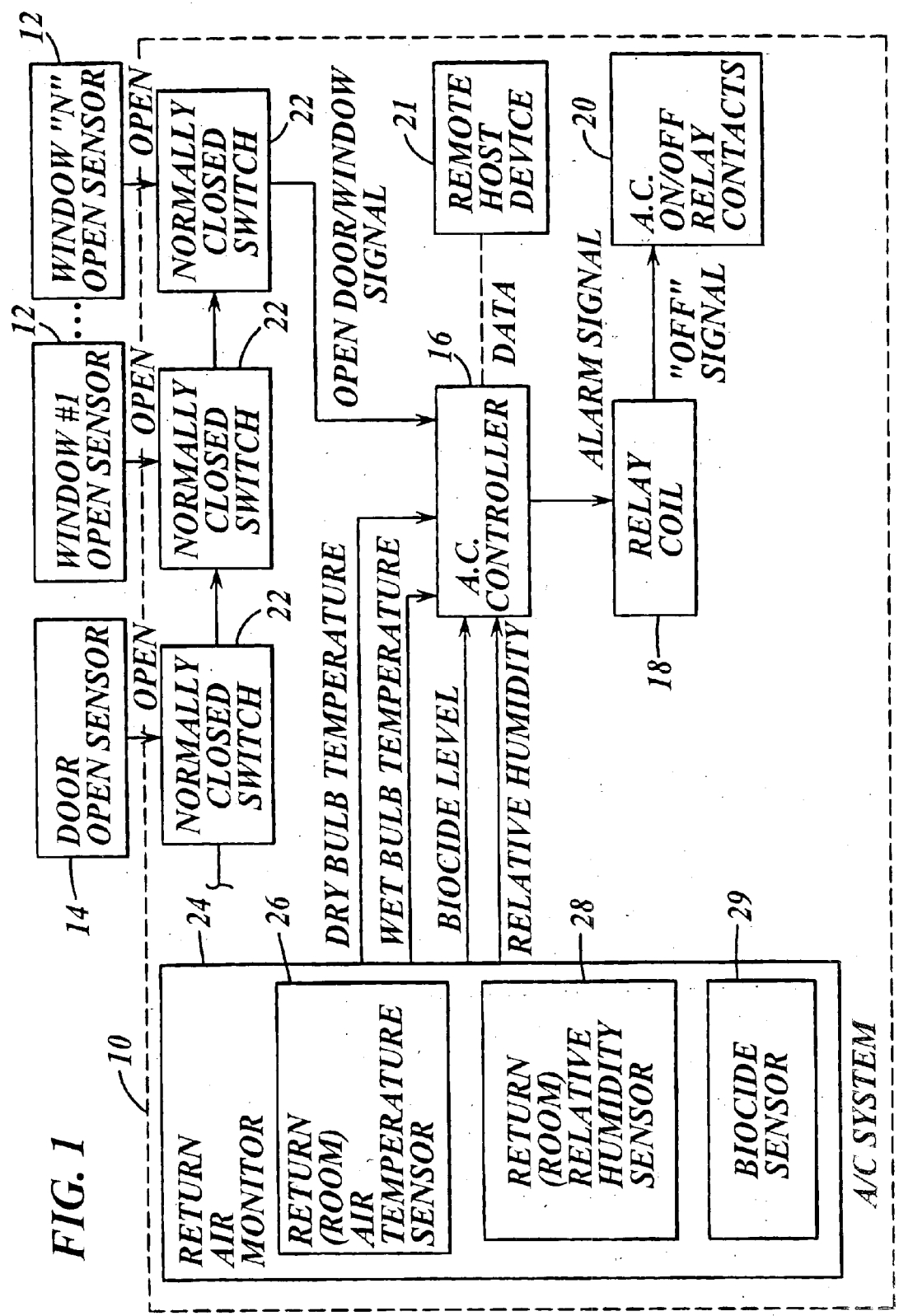
FIG. 1 is a schematic illustration of an A/C system which pulls air from the room and some cases from the outside, cools the air, and reintroduces the cool air into the room.

FIG. 1 illustrates an A/C System 10 which would conventionally be located within a room or suite of rooms or area to be cooled. The area to be cooled, which could for example be a motel room or apartment unit, has an exterior door and may have one or more openable windows. Associated with each exterior window is a Window Open Sensor 12 and associated with each exterior door is a Door Open Sensor 14.

The A/C System has an A/C Controller 16 which can issue an Alarm Signal to a Relay Coil 18 which will respond by changing the position of A/C On/Off Relay Contacts 20 which will turn off the A/C. The A.C. controller also has a transmitter for transmitting Data to a receiver of a Remote Host Device 21.

When a door or window is open, the "Open" output from the Door Open Sensor 14/Window Open Sensor 12 will open an associated Normally Closed Switch 22 whereby an Open Door/Window Signal will be supplied to the A/C Controller. The A/C Controller will issue an Alarm Signal to the Relay Coil. If desired each door/window could be associated with a discrete circuit so that window/door specific information could be generated.

The A/C System 10 has a Return Air Monitor 24 including a Return (Room) Air Dry Bulb Temperature Sensor 26 and a Return (Room) Air Relative Humidity (or wet bulb) Sensor 28, which collectively allow the computation and recording of Dry Bulb Temperature, Wet Bulb Temperature and Relative Humidity and its supply at the A/C Controller. The A/C system may also include a Biocide Sensor 29 which determines the concentration of a biocide (the Biocide Level) in the air resulting from a suitable biocide supply located within the system or elsewhere. The Return Air Monitor supplies the Biocide Level to the A/C Controller.

Figure 2:
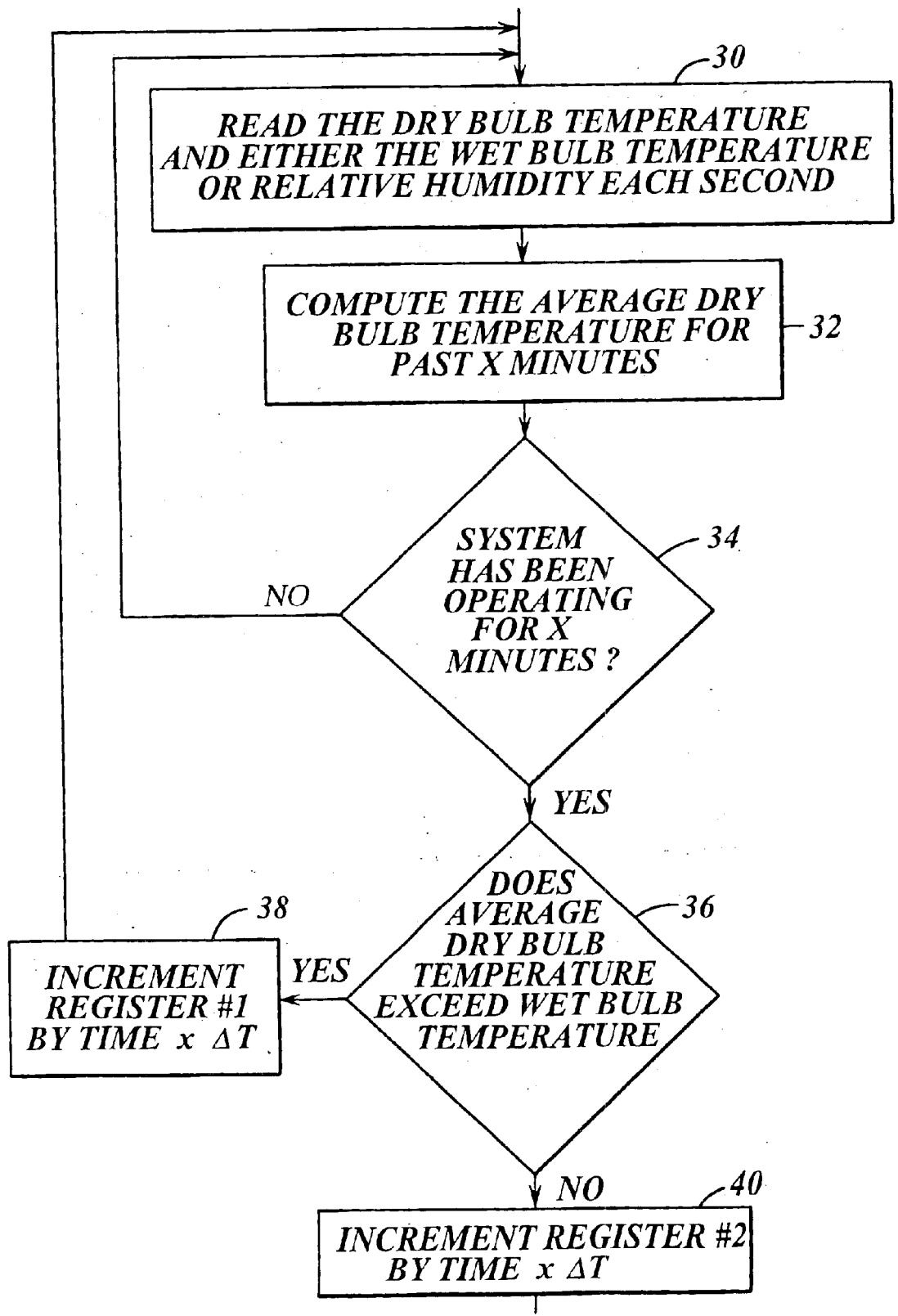
FIG. 2 is a logic diagram illustrating a portion of the control algorithm for the A/C system shown in FIG. 1.
Figure 3:
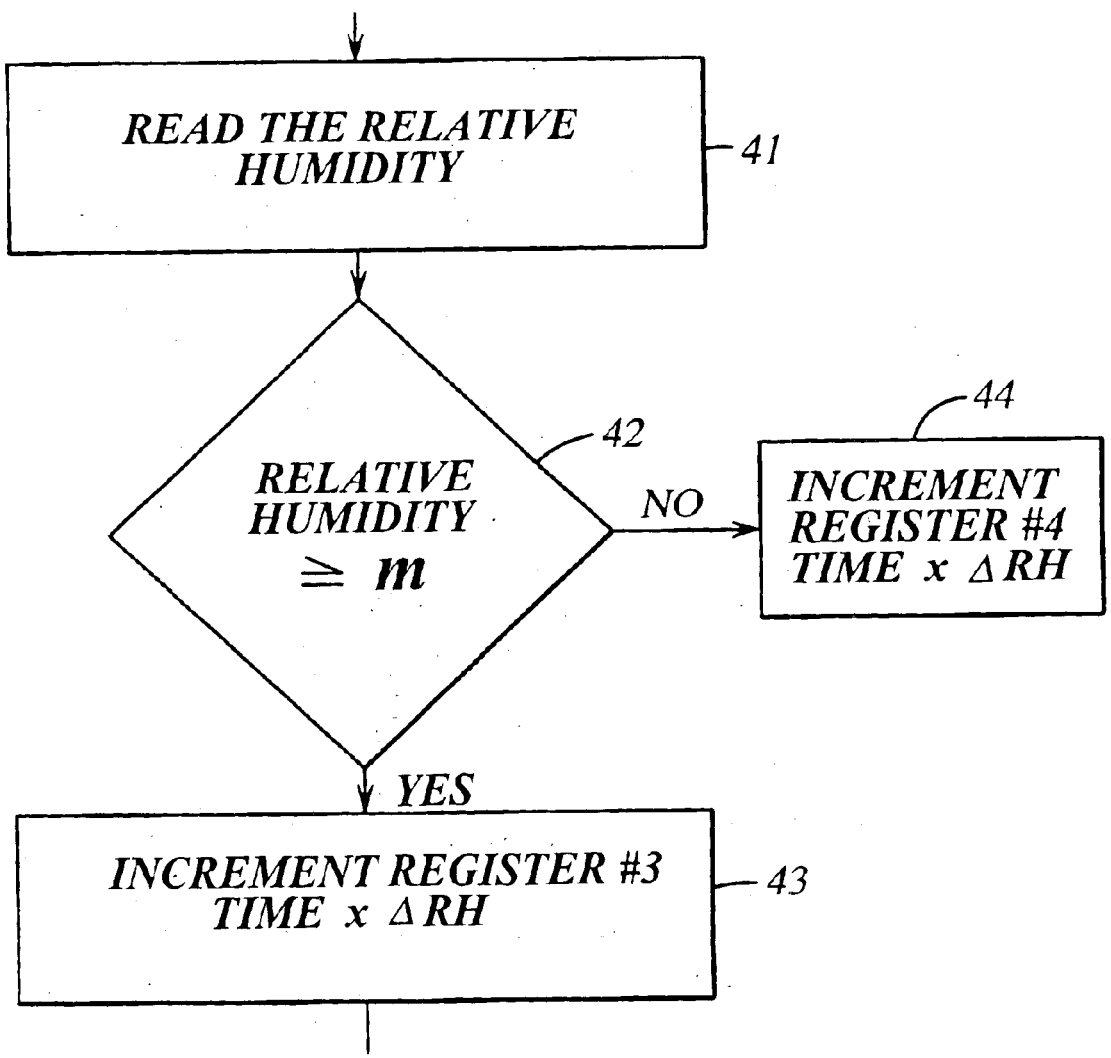
FIG. 3 is a logic diagram illustrating another portion of the control algorithm for the A/C system shown in FIG. 1.
Figure 4:
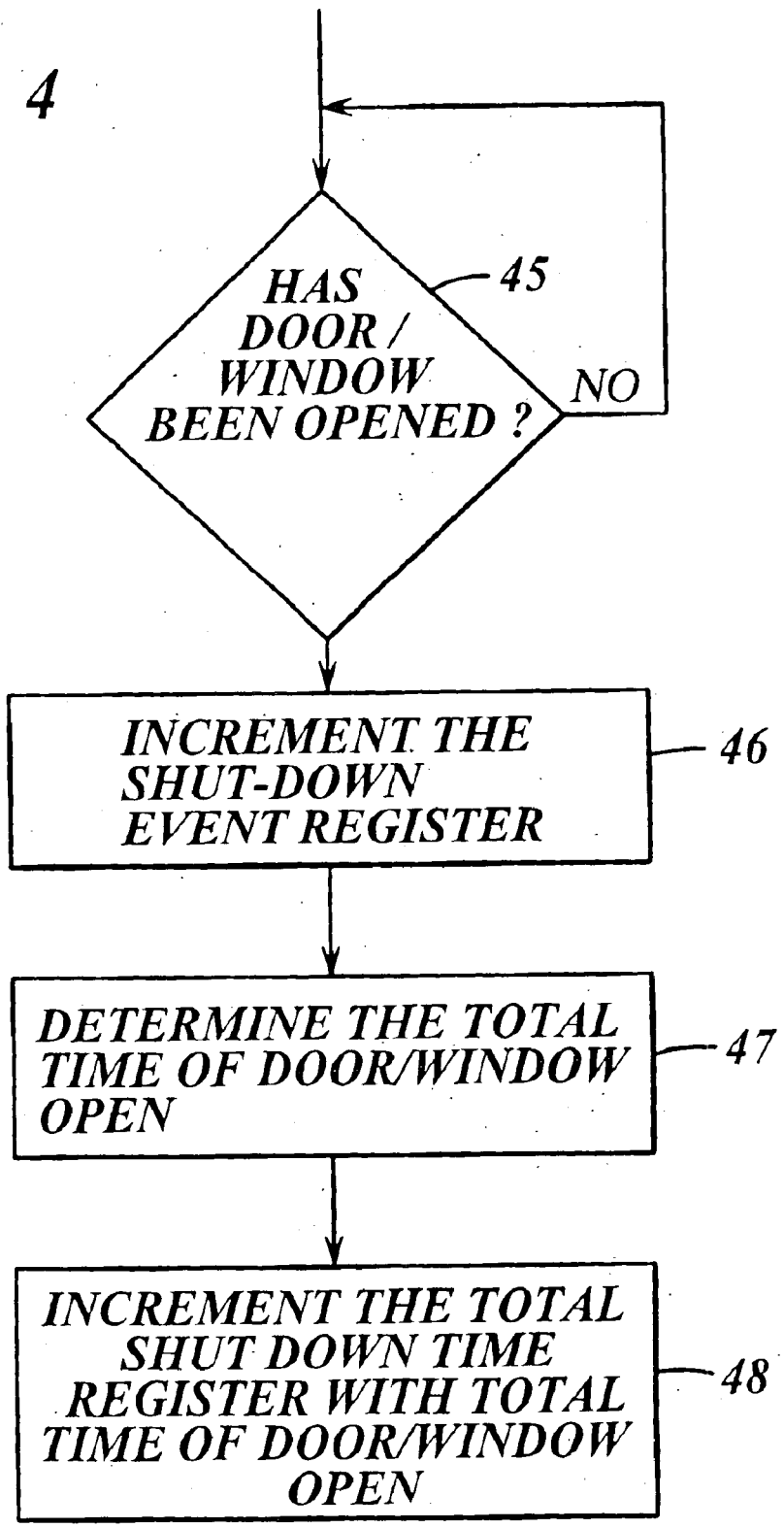
FIG. 4 is a logic diagram illustrating yet another portion of the control algorithm for the A/C system shown in FIG. 1.

The monitoring algorithm for the A/C Controller is illustrated in FIGS. 2–4. In FIG. 2, the A/C Controller proceeds to Read The Dry Bulb Temperature And Either The Wet Bulb Temperature Or The Relative Humidity Each Second 30 (any time increment can be selected). The controller will then Compute The Average Dry Bulb Temperature For The Past X Minutes 32. When the controller determines that the System Has Been Operating For X Minutes? 34 it will then evaluate the query "Does Average Dry Bulb Temperature Exceed Wet Bulb Temperature ?" 36. If this query is answered in the affirmative the control will Increment Register #1 38 By Time Times Delta T (the difference in average dry and current wet bulb temperature multiplied times time) and if it is in the negative it will Increment Register #2 By Time Times Delta T 40. The reading on Register #1 is indicative of conditions that will dry out the sheetrock and concrete. The reading on Register #2 is indicative of conditions that will encourage condensation and mold growth.

The controller will then Read The Relative Humidity 41 (FIG. 3) and will determine whether The Relative Humidity (or an average over a selected time period) Is Greater Than "M" (a set value) 42. If the query is answered in the affirmative, the control will Increment Register #3 Time X Delta RH (relative humidity vs. M) 43. If it is in the negative it will Increment Register #4 Time X Delta RH 44.

FIG. 4 further illustrates the control algorithm for the A/C controller. When the query "Has Door/Window Been Opened?" 45 is answered in the affirmative the controller proceeds to Increment The Shut-Down Event Register 46 and Determine The Total Time Of Door/Window Open 47 and Increment The Total Shut-Down Time Register With The Total Time Of Door/Window Open 48.

Figure 5:
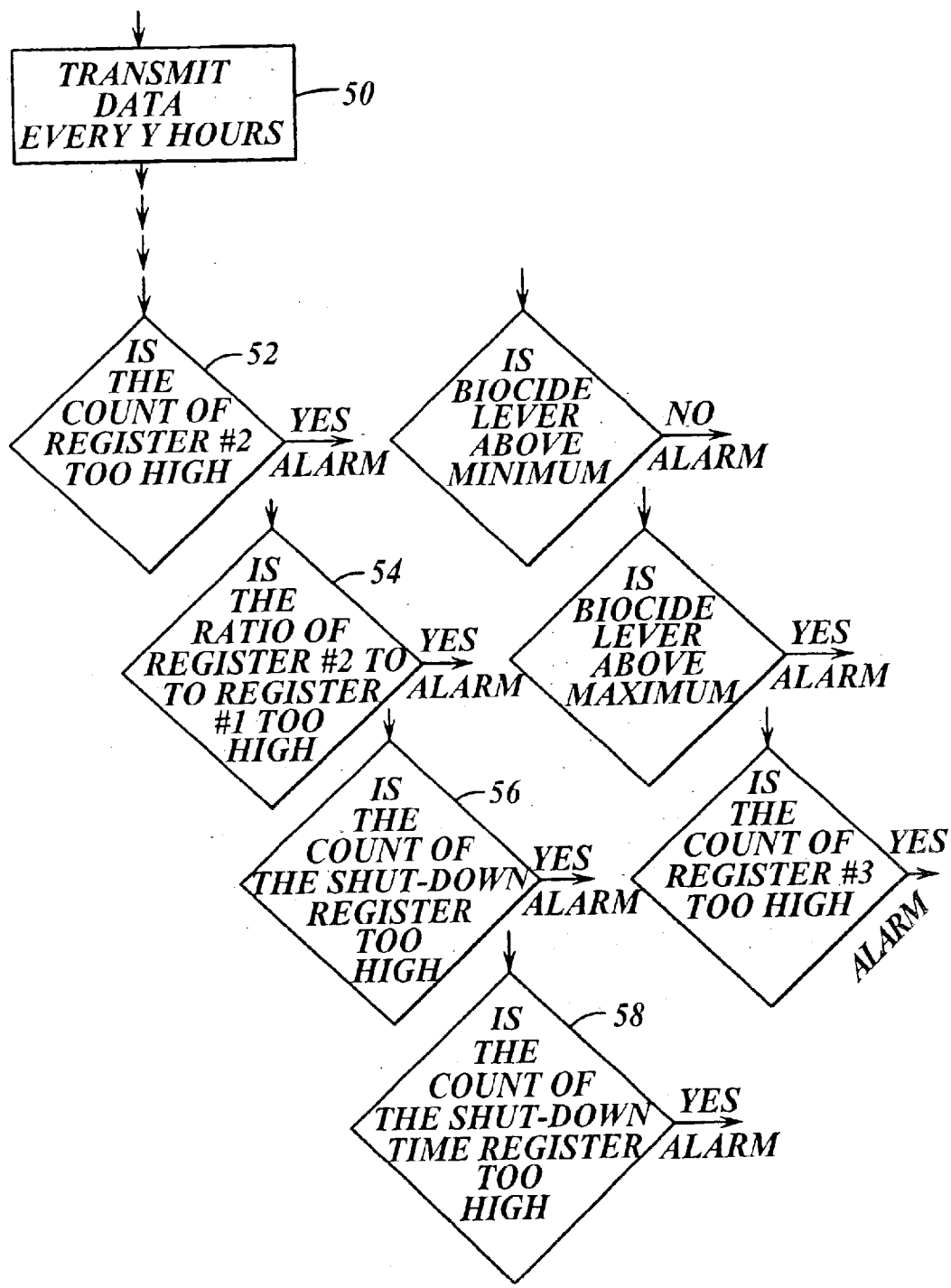
FIG. 5 is a logic diagram illustrating the control algorithm for the Remote Host Device.

FIG. 5 shows that the controller will Transmit Data Every Y Hours 50 to the Remote Host Device which has its own control algorithm shown in FIG. 5. The control algorithm of the Remote Host Device evaluates queries including 1. Is The Count On Register # 2 Too High 52; 2. Is The Ratio Of Register No. 2 To Register #1 Too High 54; 3. Is The Count Of Shut-Down Register Too High 56; and 4. Is The Count Of The Total Shut Time Register Too High 58; 5. Is Biocide Level Above Minimum; 6. Is Biocide Level Above Maximum; and 7. Is The Count Of Register #3 Too High, and where a query is answered to indicate a problem, an Alarm will issue. The Remote Host Device keeps a permanent record of the received data and all alarms.

In an illustrative application each room of a motel could include the system and the remote host device could be located at the motel management office. Alarms could precipitate appropriate corrective action.

What is claimed is:

1. An air conditioning system comprising an air conditioner for cooling air within an area, an air conditioner controller for defining information from input data concerning the temperature and/or relative humidity of the air within the area being cooled by the air conditioner including a first register having a count to be incremented by time times Delta T where Delta T is the positive difference between average dry bulb temperature and wet bulb temperature and the time is the time between temperature readings, and transmitting means for periodically transmitting the content of said first register, a return air monitor for defining data concerning the temperature and relative humidity of the air within the area being cooled by the air conditioner and inputting the data into the air conditioner controller, a remote host device for receiving, retaining and presenting transmitted information or information derived therefrom.

2. An air conditioning system according to claim 1, wherein said air conditioner has shut off means for turning off the air conditioner including air conditioner on/off relay contacts and a relay coil for supplying said on/off relay contacts with an off signal and wherein said air conditioner controller includes means for selectively operating said shut off means based on selected defined information.

3. An air conditioning system according to claim 1, wherein said means for defining information from input data concerning the temperature and/or relative humidity of the air within the area being cooled by the air conditioner further includes a second register to be incremented by time times Delta T where Delta T is the negative difference between average dry bulb temperature and wet bulb temperature and the time is the time between temperature readings and said transmitting means further comprises means for periodically transmitting the content of said second register.

4. An air conditioning system according to claim 1, wherein said means for defining information from input data concerning the temperature and/or relative humidity of the air within the area being cooled by the air conditioner includes a third register to be incremented by time times Delta RH where Delta RH is the positive difference between the read relative humidity and an acceptable value and time is the time between readings and said transmitting means further comprises means for periodically transmitting the content of said third register.

5. An air conditioning system according to claim 3, wherein the transmitted defined information concerning input data concerning the temperature and/or relative humidity of the air within the area being cooled by the air conditioner includes the count of registers 1 and 2 and said remote host device comprises control means for issuing an alarm if the count of register #2 is too high.

6. An air conditioning system according to claim 3, wherein the transmitted defined information concerning input data concerning the temperature and/or relative humidity of the air within the area being cooled by the air conditioner includes the count of registers 1 and 2 and said remote host device comprises control means for issuing an alarm if the ratio of the count of register #2 to register #1 is too high.

7. An air conditioning system according to claim 4, wherein the transmitted defined information concerning input data concerning the temperature and/or relative humidity of the air within the area being cooled by the air conditioner includes the count of register #3 and said remote host device comprises control means for issuing an alarm if the count of register #3 is too high.

8. An air conditioning system according to claim 1, wherein said return air monitor further comprises means for defining data concerning the level of a biocide in the air within the area being cooled by the air conditioner and inputting the level of the biocide into the air conditioner controller, said air conditioner controller transmitting means transmits the current biocide level when it transmits defined information, and wherein said remote host device comprises means for issuing an alarm either if the biocide level is too high or too low.

9. An air conditioning system comprising an air conditioner for cooling air within an area, said air conditioner having shut off means operated upon the receipt of an alarm signal for turning off the air conditioner, an air conditioner controller for defining information from input data concerning the open status of a door and or window(s) and for supplying an alarm signal to said shut off means when a door/window is open, said air conditioner controller including a shut-down event register which will be incremented each time a door/window is opened and transmitting means for periodically transmitting the content of said shut-down register, and a remote host device for receiving, retaining and presenting transmitted information or information derived therefrom.

10. An air conditioning system according to claim 9, wherein said air conditioner controller further includes means for determining the total time that a door/window is open, a total shut-down time register which will be incremented by the total time a door/window is open each time a door/window is opened and transmitting means for periodically transmitting the content of said total shut-down time register.

* * * * *